United States Patent [19]
Johnsen et al.

[11] Patent Number: 5,109,153
[45] Date of Patent: Apr. 28, 1992

[54] FLASH IMAGING AND VOIDABLE ARTICLES

[76] Inventors: Edward L. Johnsen, Five Bent Ave., Wayland, Mass. 01778; Stephen D. Fantone, 11 Grant Rd., Lynnfield, Mass. 01940

[21] Appl. No.: 510,235

[22] Filed: Apr. 17, 1990

[51] Int. Cl.$^5$ .................. G06K 7/10; G03B 27/00
[52] U.S. Cl. ..................... 235/468; 283/85; 235/432; 355/1
[58] Field of Search ............... 235/468, 432; 283/85, 283/94, 901, 902; 355/1

[56] References Cited

U.S. PATENT DOCUMENTS

| | | | |
|---|---|---|---|
| 1,167,566 | 1/1916 | Jenkins | 283/85 X |
| 3,959,624 | 5/1976 | Kaslow | |
| 3,995,741 | 12/1976 | Henderson | |
| 4,163,570 | 8/1979 | Greenaway | |
| 4,432,630 | 2/1984 | Haas | |
| 4,486,033 | 12/1984 | Parrotta | 283/94 |
| 4,505,498 | 3/1985 | Weinberger | |
| 4,663,518 | 5/1987 | Borror et al. | 283/85 X |
| 4,748,680 | 5/1988 | Margolin | 355/1 X |
| 4,752,675 | 6/1988 | Zetmeir | |
| 4,760,421 | 7/1988 | Margolin | 335/1 |
| 4,791,281 | 12/1988 | Johnsen et al. | |
| 4,889,367 | 12/1989 | Miller | 235/468 X |

FOREIGN PATENT DOCUMENTS

0305211 3/1989 European Pat. Off. .
0331352 9/1989 European Pat. Off. .

OTHER PUBLICATIONS

Leksell, David et al., "Construction and Characterization of 12-in. Long TFEL Edge Emitter Eraser Bar for Electrophotographic Applications", *Journal of Imaging Technology*, vol. 14, No. 1, Feb. 1988, pp. 12–15.

Kun, Z. K. et al., "TFEL Ede Emitter Array for Optical Image Bar Applications", *Proceedings of the SID*, vol. 28/1, 1987, pp. 81–85.

"How to Tame a Monster", *Diconix Dijit*, copyrighted 1986, 6 pages.

Stefanides, E. J., "Thin Film Device Delivers Sharper Computer Printing", Design News, Feb. 13, 1989, pp. 104–105.

Kun, Koltan et al., "Test Station for Thin Film Electroluminescent (TFEL) Edge Emitter Array, a Potential Low Cost, All Solid State Imaging Device": SPIE, vol. 901, 1988, pp. 25–31.

Leksell, D. et al., "The Construction and Characterization of a 400-dpi Thin Film Electroluminescence Edge Emitter", Proceedings of the SID, vol. 29/2, 1988, pp. 147–150.

*Primary Examiner*—David Trafton
*Attorney, Agent, or Firm*—Robert M. Asher

[57] ABSTRACT

Voidable articles are made with an identification code and a radiant energy responsive material coated over said code. The material is invisible and remains unactivated in ambient light but obscures the identification code upon being exposed to radiant energies such as heat or light from within a particular wavelength range. Printing can be accomplished by imaging light onto a substrate coated with photosensitive material including an infrared absorbing dye. A cancellation device for voiding documents of the present invention is made with a scanner, a comparator and a radiant energy source for exposing the document to activate the energy responsive material on the document.

35 Claims, 5 Drawing Sheets

FLASH IMAGING AND VOIDABLE ARTICLES

BACKGROUND OF THE INVENTION

The present invention is directed to articles which are voidable through the application of radiant energy. The present invention is further directed to using a controlled flash of radiant energy to cancel articles or to create an image.

Numerous articles are used in everyday life which must be identified, validated and/or cancelled. Such articles include checks, currency, stock certificates, coupons, food stamps, postage stamps or the like. While methods are presently available for mechanically scanning or reading such documents, the process of cancelling and/or validating such articles is generally slowed by employing a cancellation technique which involves a mechanical process of stamping or destroying the article. Any mechanical device is subject to wear and tear which will shorten its usable lifetime or require the assistance of repair personnel.

Likewise, mechanical methods are generally employed in the printing industry. Ink or the like is placed onto a substrate in the form of images as pictures, symbols and/or alpha numeric characters by one of several well known methods such as letterpress, letterset, offset, gravure, thermography, ink jet, laser imaging, ion deposition, lithography or other mechanical and/or computerized methods. In the mass production of articles requiring individually identifiable codes such as bar codes, arabic numbers, MICR (magnetic ink character recognition), and others, the usual methods of placing these identification codes on each article are mechanical number heads, ink jet, laser or ion deposition imaging. Such methods severely limit the speed at which the article can be encoded. For example, mechanical bar code imaging is limited to processing a web of paper at speeds of 500 feet per minute; laser imaging to about 100 feet of paper per minute; ion deposition to about 400 feet of paper per minute; and ink jet to about 700 feet of paper per minute, to produce images of bar codes which will meet standards of reproduction set forth by the industry. These speed limitations severely inhibit production of articles and because production of such articles without encoding can be done at speeds of 2000 feet of paper per minute, encoded articles are far more costly to the buyer. Quality of the identification code whether bar code, OCR or other, is adversely affected by the speed of the web of articles being produced. Additionally, individual article production is also limited in a similar way when being produced from sheets of a substrate.

It is an object of the present invention to provide a non-mechanical method of printing. It is a further object of the present invention to provide encoded articles which can be easily voided through the use of non-mechanical means.

SUMMARY OF THE INVENTION

The present invention is directed to articles which can be voided by exposure to radiant energy and a method of printing which employs radiant energy.

The voidable articles of the present invention include a printed surface bearing an identification code. A material peculiarly responsive to a particular form of radiant energy, whether it be heat or light, is coated on the article surface under or over the identification code. Thus, the articles of the present invention can be voided by passing the article under the particular form of radiant energy to which the material is sensitive. Such an article advantageously can be cancelled without requiring a mechanical operation. Photosensitive material can be advantageously placed over or under the machine readable code so that activation of the material renders the code unreadable or changes the data in the code. Changing the data in the code could, for example, be used to include the fact that the coupon has been cancelled.

The photosensitive material used on a voidable article of the present invention includes an infra-red absorbing or radiant dye to enhance the absorption of the radiant energy to reduce the amount of time and energy required to change or cancel the photosensitive material.

The device for invalidating articles of the present invention includes a scanner capable of reading the machine readable code on an article, a comparator for generating a validity signal if the code on the printed surface of the article meets a validity criteria and a radiant energy source which exposes at least a portion of the printed surface to a dose of radiant energy in response to a validity signal. Such a device without mechanical means provides a secure method of cancelling only those articles which meet the validity criteria.

The method of printing of the present invention includes exposing a photosensitive material to a modulated light source to create an image on the photosensitive material on the substrate. Specific images can be formed by shining the light through a template; controlling a multitude of light sources in a linear array to generate images as the substrate is advanced past the array; and/or a mechanism that scans light over the substrate. The choice of a light source is dictated by the particular photosensitive material to be used. Potential light sources that could be used include, but are not limited to tungsten halogen bulbs, lasers, laser diodes, light switches or the like. The printer imaging heads would be designed to be controlled by a computer in order to get variable information. Such a printing method can be used to produce bar codes, numbers, letters or any desired image. Advantageously, this method can be used to successively print different bar codes or numerical images on successive articles to uniquely identify each such article.

Other objects and advantages of the present invention shall become apparent to those of ordinary skill in the art in conjunction with the following drawings.

DETAILED DESCRIPTION OF THE PREFERRED EMBODIMENT

Figure 1:
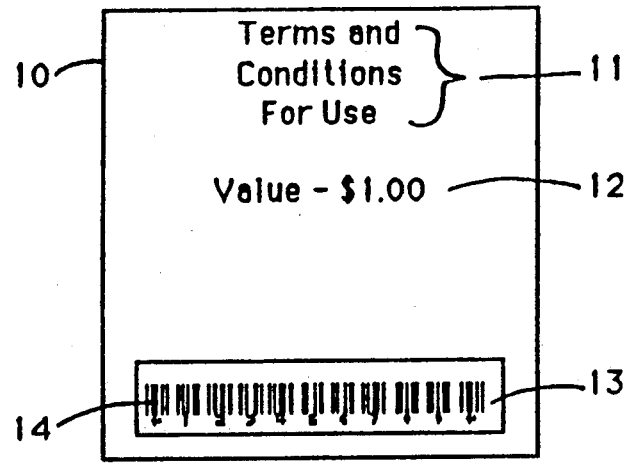
FIG. 1 is a plan view of a coupon of the present invention.

Referring now to the drawings, FIG. 1 illustrates a voidable article 10 of the present invention. The voidable article may be a coupon, check, stock certificate, food stamp, postage stamp, cereal box, or the like. The voidable article 10 described herein is a document, in particular, a merchandise coupon. The coupon has a printed surface bearing a message 11 which indicates the terms and conditions for using the coupon. This is the portion which explains the product or service for which the coupon is to be used, the expiration date and any other terms and conditions associated with the coupon. These terms and conditions set forth a criteria for determining whether the coupon may be validly accepted by a store when presented by a customer. The assigned face value 12 appears on the printed surface of the coupon. The advertiser sets the terms and conditions and value of the coupon at its discretion.

In accordance with the present invention, the coupon carries on its printed surface a coating of material peculiarly responsive to a form of radiant energy. The material 13 is invisible on the coupon. As used herein, "invisible" may include situations in which the material is only slightly visible or visible as background, and does not interfere with the genuinely visible markings on the coupon. While an invisible marking might provide some discoloration, which can be seen by the human eye, the material 13, while in its invisible state, will not interfere with a scanner reading the code on the coupon. The material 13 may be responsive to radiant energy such as heat or light. Upon being exposed to heat or light energy not normally encountered in ordinary use, the material 13 will become visible. The material may be coated on or embedded in an area of the coupon. Various placements of the photosensitive material 13 on a voidable coupon 10 are possible within the scope of the invention.

The presently preferred material 13 is a photosensitive material formed by a mixture of a dry silver material and an infrared absorbing dye. Dry silver materials are commonly used in thermal papers, printing media and transparency bases. These materials are well understood and are based on a chemical process using silver behenate and a developer. The developer is typically methyl gallate, however, other developers are also possible. The dry silver materials by themselves are generally not very sensitive to direct illumination. This is overcome by adding the infrared absorbing dye to the mixture. The infrared absorbing dye dramatically increases the photosensitivity of the material. Two such infrared absorbing dyes which are available for use in the material are Eastman Kodak's IR-125 and IR-132. It is highly desirable to use dyes such as these, as it is necessary that the material 13 respond to particular wavelengths of light which are not normally present in ambient light in amounts sufficient to cause the material 13 to discolor. The preferred materials exhibit high absorption of light wavelengths in the approximate range of about 750 nanometers to 950 nanometers. High absorption means sufficient energy is absorbed to cause the photosensitive material 13 to be activated and become visible. The material 13 exhibits low absorption in the visible spectrum. Thus, under ordinary conditions the material covered by material 13 remains unactivated and is therefore invisible. Typically, exposure levels of about 50 ergs per square centimeter of radiant energy when sensitized with one of the infrared absorbing dyes described before are sufficient to activate the photosensitive material 13. Once the photoresponsive material 13 is activated, a substantially permanent marking is created.

The coupon 10 may be provided with a machine readable code 14. The code 14 may improve processing of the coupon at the point of sale location. The machine readable code may be a series of numbers readable by a scanner or, more typically, a bar code. The bar code may be a UPC code particularly identifying the product for which the coupon 10 is intended. Alternatively, as described in U.S. Pat. No. 4,791,281 (Johnsen et al.), the bar code 14 may uniquely identify the coupon. Such a bar code may include the product identification code and may further include additional coding to uniquely identify the coupon. The bar code may be pre-printed on the coupon or, to make it an original indicia, it may be imaged at a later point in the production process. "Original indicia" as used herein are unique markings imaged on a coupon during high speed production and packaging of the coupons.

Figure 2:
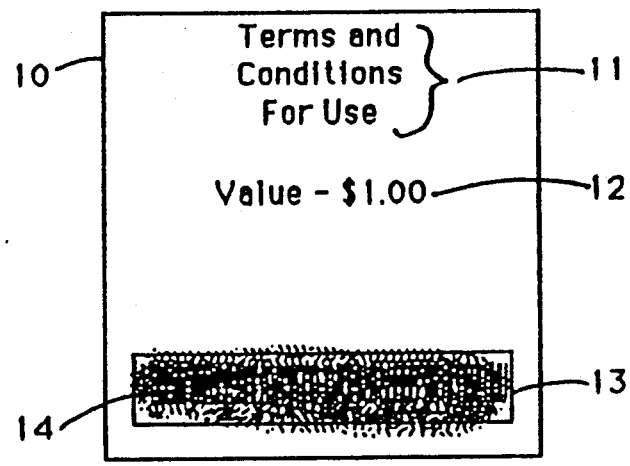
FIG. 2 is a plan view of a voided coupon of the present invention.
Figure 3:
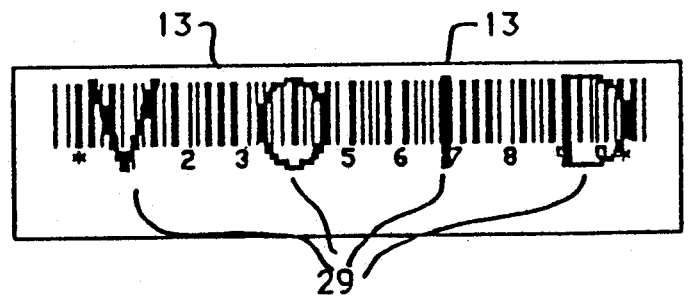
FIG. 3 is an alternate embodiment of a visible portion of a voided article of the present invention.

Referring now to FIG. 2, the document of FIG. 1 is shown after the photoresponsive material 13 has been activated. Here, the photoresponsive material 13 was located on the coupon 10 so as to cover the machine readable code 14. Upon activation of the material 13 the code 14 becomes obscured so as to be unreadable. When these coupons are used in conjunction with scanning machines at the point of sale, the obscured machine readable code will prevent the coupon from being read. Therefore, once its machine readable code is obscured, the coupon will be of no value. Alternatively, the photoresponsive material 13 can be spread over the code on an article so as to spell a word such as "void" 29 upon becoming activated, as illustrated in FIG. 3. Another possibility is to cover an entire article with the photoresponsive material 13. The activation equipment could be used to expose only certain portions of the material so as to spell out a word or obscure a sufficient amount of the coupon so that it cannot be used again. Likewise, the material 13 could be spread on an article in the form of the letter "X" so as to print an "X" over the entire article when activated. These and other placements and activations of the material 13 are only a few of the ways of utilizing the material 13 to achieve a desired result. The only requirement is that when the material 13 is activated, the article will be recognized as being void, cancelled or invalid, both by electronic devices and human observation.

Figure 4:
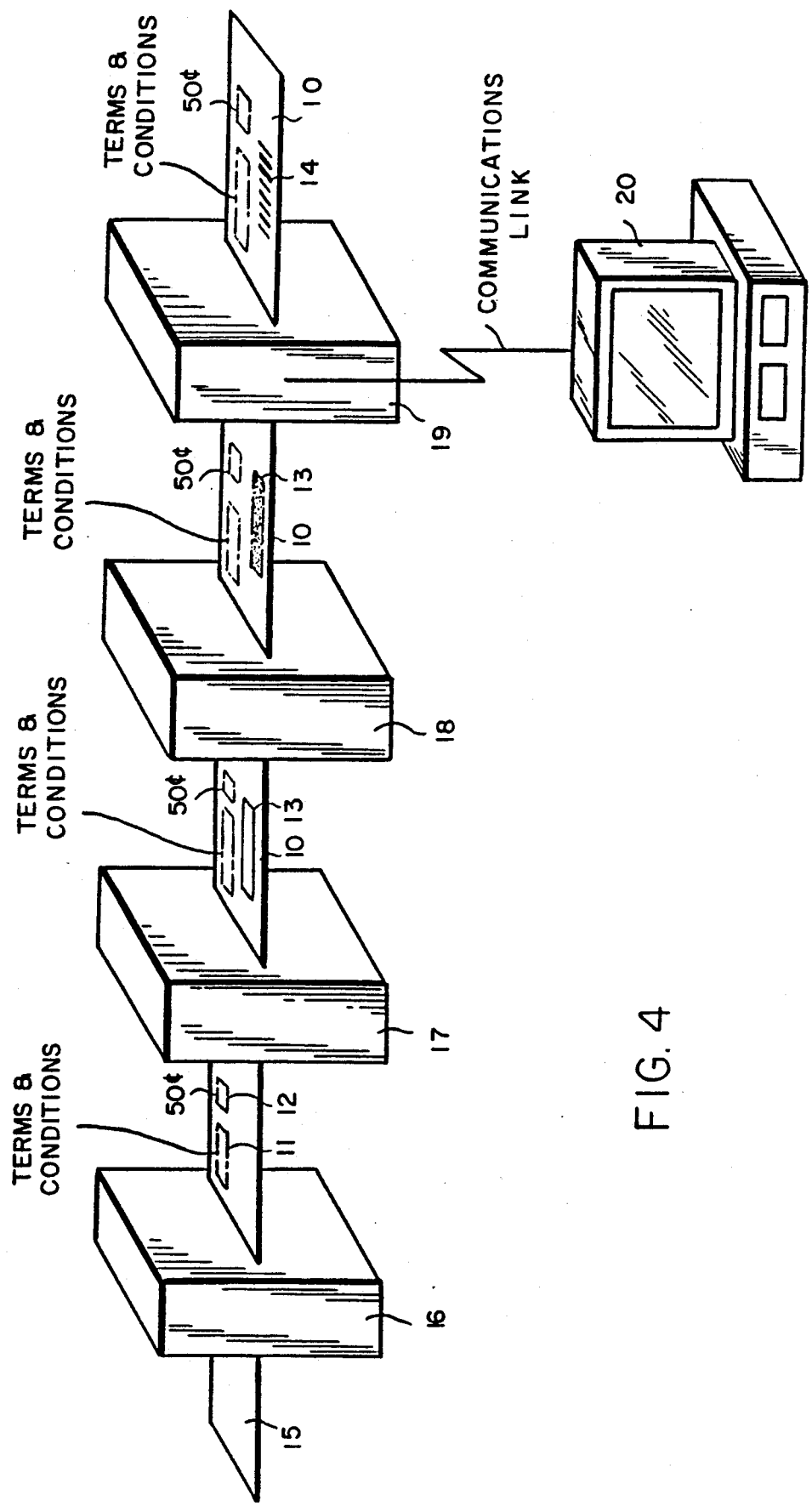
FIG. 4 is a schematic drawing of a method for making the documents of the present invention.
Figure 5:
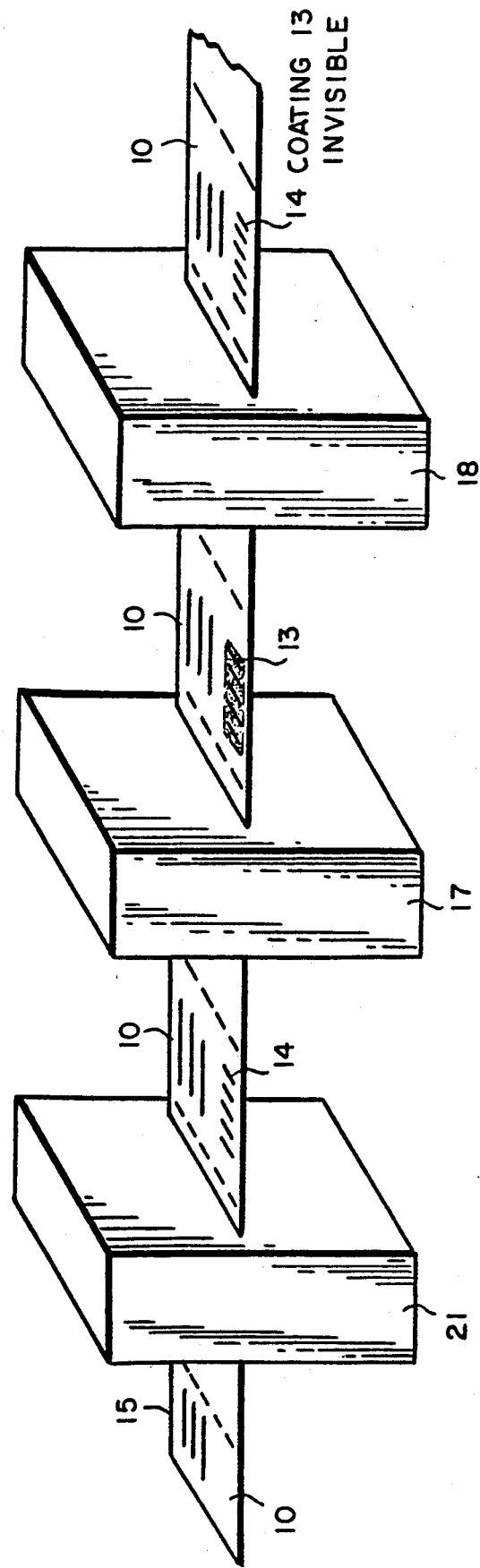
FIG. 5 is a schematic drawing of an alternative method for making the documents of the present invention.

The present invention encompasses a new method of printing which may be used in the manufacture of the voidable articles described herein, as well as in the printing of many other types of articles. Referring now to FIGS. 4 and 5, alternative methods for printing voidable articles in accordance with the present invention are described. A web 15 of paper is fed into a printer 16. Using conventional methods, the printer 16 prints the terms and conditions 11, value 12 and other information which may be required by the advertiser upon the coupon 10. An applicator 17 applies a pattern of the photoresponsive material 13 to the web 15 as it moves through the applicator. The applicator may be the same as or similar to those currently in use in the printing industry to print via letterpress, letterset, offset, gravure, thermography, pattern coating methods, lithography or the like, normally used in depositing inks, chemicals or the like, onto a substrate.

The photoresponsive material 13 may be fixed on the paper by drying it in the dryer 18, which may or may not be necessary, depending upon the method of application chosen. The dryer 18 may be electronic, gas flame, heat, microwave or other usual dryer types commonly used in the graphic arts. The selection of the dryer should be one which will not use radiant energy which will activate the photoresponsive material 13. A dryer may not be necessary as it may be sufficient to air dry the photoresponsive material 13 as it proceeds in production.

Once the material 13 has been fixed to the paper, the paper can be fed into a flash printer 19. The flash printer is connected to a computer 20 which operates a series of fiber optic bundles which span the web 15. As the photoresponsive coating material 13 passes beneath the printer 19, each bundle of fiber optic fibers under computer control emits or does not emit a flash of energy to activate a dot portion of a character to be created on the web 15. The bundle of fiber optics is well known to those knowledgeable in the art of imaging. The source of light, or radiant energy, can be a laser diode or the like. The computer 20 controls the printer 19 to selectively switch on or off the light sources for the fiber optic bundles, thus activating the photoresponsive material 13 as it passes under the printer. Thus, an original indicia bar code is created on the coupon 10. The computer control of the fiber optic bundles operates in a fashion similar to the control of fiber optics in a telephone network and to the high speed computer control of a dot-matrix ink jet printer. The computer 20 can generate a unique code creating the image on each coupon and can keep track of which coupons bear which codes. The printed code 14 is in an area coated with the photoresponsive material 13 so that when the coupon is redeemed, the remainder of the material 13 can be activated so as to obscure the code 14.

An alternative method for making the voidable coupon 10 is illustrated in FIG. 5. The web of paper 15 is fed through a printer 16 which prints the terms and conditions 11, value 12 and other information which may be required by the advertiser on the coupon. The pre-printed coupons are then fed through a numbering unit 21 which prints a uniquely identifiable code 14 on each coupon, such numbering unit as commonly used in the printing industry. This code may be a design or a series of numbers, however, the more typical code is a bar code 14. The imaged coupons are then fed through an applicator 17 which applies a pattern of photoresponsive material 13 over the uniquely identifiable bar code 14. The coupon may then be optionally fed into a dryer 18 to fix the material 13 on the substrate. Thus, this method prints the machine readable code 14 using conventional methods rather than the flash imaging of the present invention. The sequence of steps used in producing voidable articles may be any logical order and is not limited to the particular sequence selected for FIGS. 4 and 5.

It should be understood that flash imaging can be accomplished on the substrate of any article having the photoresponsive material applied to it, such as the dry silver material and infrared absorbing dye described above. Substrates can include, but are not limited to the following: paper, cardboard, films, acetates, mylar, plastics and the like. Printing is accomplished by controlling and emitting light through a series of fiber optic bundles directed at the photoresponsive material in a predefined pattern and sequence to form an image as the substrate passes under a flash unit 19. This is comparable to using an ink jet dot matrix printer. Instead of ink, light is flashed either on or off. The fiber optics can be bundled even closer together than the ink bar of an ink jet printer for better quality printing, plus lenses can be used to focus the light. The quality of printing will ultimately depend on how well the photosensitive material is coated on the substrate.

Figure 6:
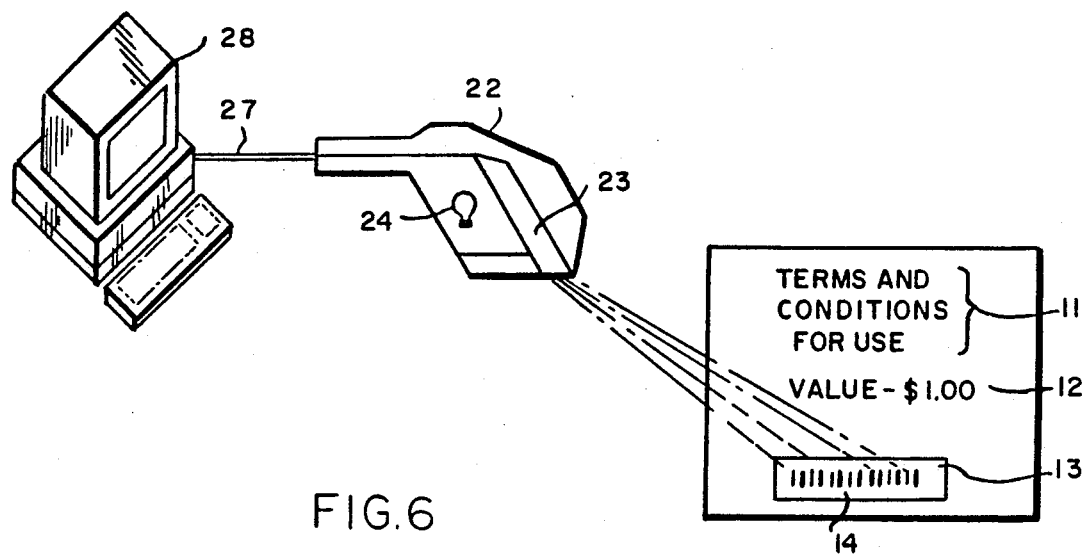
FIG. 6 is a schematic drawing of a cancellation device of the present invention, reading an identification code on a document.
Figure 7:
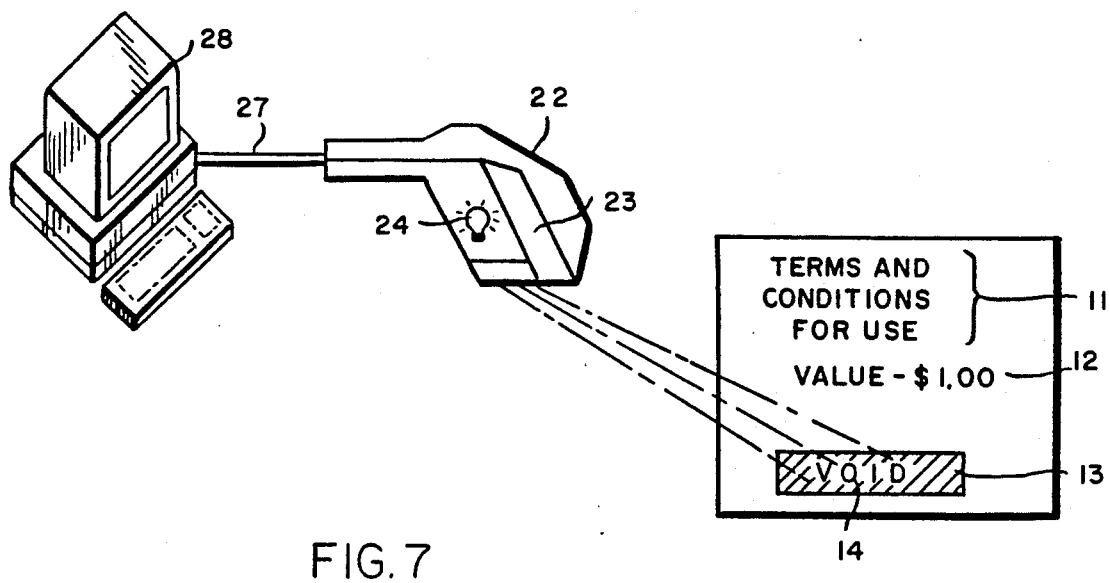
FIG. 7 is a schematic drawing of a cancellation device of the present invention cancelling the identification code.

A cancellation device 22 is illustrated in FIGS. 6 and 7. The cancellation device 22 includes a scanning unit 23 which reads a machine readable code 14. In the case of a merchandise coupon, it must be determined whether the product indicated by the machine readable code was actually purchased. In addition, other terms and conditions of the coupon which should be included in the code 14 such as the expiration date, must be satisfied. Therefore, the cancellation device is connected by a communication cable 27 to a computer 28. The computer 28 is a part of the point of sale inventory system. The inventory system makes a record of each item that is purchased by the coupon presenter. The computer compares the information from the identification code 14 with the products that have been purchased and the present date and any other validation criteria that are called for by the coupon to determine whether the coupon should be credited. If the coupon passes all of the validation criteria, the face value 12 is credited to the customer and a signal is sent back through the communication link 27 to the cancellation device 22, instructing it to cancel the coupon.

Cancellation is performed by turning on a light source element 24 which then flashes a light onto the photosensitive material 13 as illustrated in FIG. 7. The light source element 24 may be a tungsten halogen bulb, laser or laser diode or the like. The light may be directed towards the coupon with fiber optic bundles if it is desired to expose only a pattern on the photosensitive material. Upon exposure to the flash, the photoresponsive material 13 is activated and becomes visible. Preferably, the color of the material 13 is the same as that of the machine readable code 14 after activation. With the photoresponsive material 13 located over the identification code 14, it is possible to design the coupon so that once it has been cancelled it is impossible to read. Alternatively, the cancellation may only cause a modification of the machine readable code so that the scanner can be used to verify that the document is cancelled. A system may be equally implemented in which the photoresponsive material is placed on the document in an alternate manner as well. The cancellation procedure is advantageously accomplished without requiring a mechanical destruction or obliteration of the coupon.

In the event any particular retailer does not have a cancellation device 22, coupons collected by any such retailer can be sent to a clearinghouse location. At that point, all used coupons can be activated by a cancellation device 22 to obscure the machine readable code and make the coupons valueless.

Figure 8:
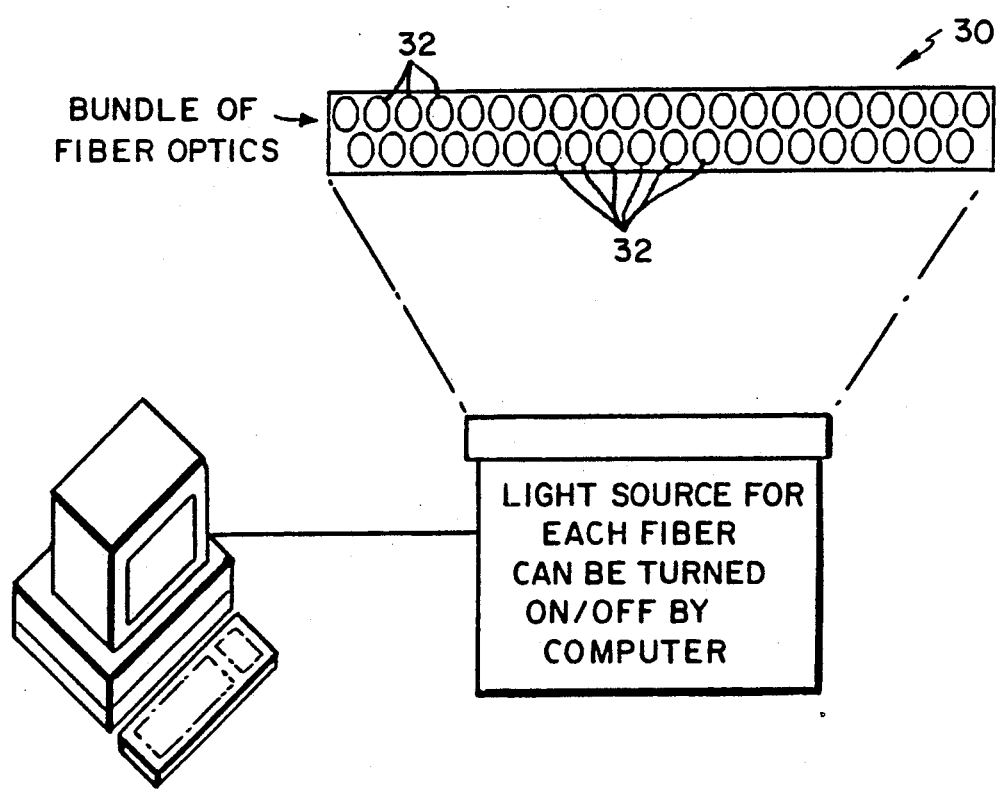
FIG. 8 is a drawing of a light source for use in the printing method of the present invention.

Referring now to FIG. 8, a flash printer head 30 is illustrated. The head 30 includes an array of optical fiber bundles 32. Each bundle is computer controlled to selectively illuminate an area of the photoresponsive material 13. Laser diodes or the like provide a light source for each optical bundle 32. Circuitry is provided as in an ink jet printer to selectively switch on laser diodes so that the head 30 can be used to create a desired image on the photoresponsive material 13.

Of course, it should be understood that various changes and modifications to the preferred embodiment described above will be apparent to those skilled in the art. For example, the radiant energy source 24 may be heat and the material 13 can be replaced by a heat responsive material. Alternatively, the computer controlled fiber optic bundles can be replaced by a light source and a template to achieve printing of desired characters. These and other changes can be made without departing from the spirit and the scope of the invention and without diminishing its attendant advantages. It is therefore intended that such changes and modifications be covered by the following claims.

We claim:

1. A voidable article comprising:
 a printed surface;
 a machine readable identification code on an area of said printed surface;
 a material, peculiarly responsive to a particular form of radiant energy not normally present in ambient light in amounts sufficient to cause said material to discolor, positioned on said printed surface in the area of said machine readable code, said material making said code unreadable after being exposed to said particular form of radiant energy.

2. The voidable article of claim 1 wherein said identification code is machine readable.

3. The article of claim 1 wherein said particular form of radiant energy comprises heat.

4. The article of claim 1 wherein said particular form of radiant energy comprises a range of light wavelengths.

5. The article of claim 4 wherein said range of light wavelengths covers from about 750 nanometers to about 950 nanometers.

6. The article of claim 5 wherein said material comprises a mixture of dry silver and infra-red absorbing dye.

7. The article of claim 1 wherein said machine readable code is a bar code.

8. The article of claim 7 wherein said bar code is a UPC code identifying a product.

9. The article of claim 7 wherein said bar code is an original indicia uniquely identifying said document.

10. The article of claim 1 wherein said material is located so as to be spread over an entire face of said document.

11. The article of claim 1 wherein said material is embedded in said document.

12. The article of claim 1 wherein said material is not visible on said document until it is exposed to said particular form of radiant energy.

13. The article of claim 1 wherein said document is a merchandise coupon.

14. A voidable document comprising:
 a document;
 a machine readable code on an area of said document;
 an invisible photoresponsive material unresponsive to ambient light, located on said document so that upon being exposed to a sufficient intensity of non-visible wavelength light to activate said photoresponsive material, a visible marking appears on said document, wherein said sufficient intensity of non-visible wavelength light is an intensity for said non-visible wavelength light greater than is normally present in ambient light.

15. The document of claim 14 wherein said photoresponsive material is placed in the area of said machine readable code so that when said photoresponsive material is activated said code is obscured.

16. The document of claim 14 wherein said photoresponsive material is embedded throughout said document.

17. The document of claim 14 wherein said photoresponsive material is positioned on said document in the form of an image so that when activated the image appears on said document.

18. The document of claim 14 wherein said photoresponsive material comprises a mixture of dry silver and infrared absorbing dye.

19. The document of claim 14 wherein said photoresponsive material exhibits high absorption of light wavelengths in an approximate range from about 750 nanometers to about 950 nonometers and low absorption below said range.

20. The document of claim 14 wherein said sufficient intensity comprises about 50 ergs/cm$^2$.

21. The document of claim 14 wherein said machine readable code is a bar code.

22. The document of claim 21 wherein said bar code is a UPC code identifying a product.

23. The document of claim 21 wherein said bar code is an original indicia uniquely identifying said document.

24. A device for invalidating articles comprising:
 a scanner capable of reading a machine readable code on an article;
 comparator means for receiving a signal from said scanner representative of said machine readable code and for generating a validity signal indicating whether said article has met a validity criteria; and
 a radiant energy source which exposes at least a portion of said article to a dose of radiant energy in response to a validity signal from said comparator means, said radiant energy causing a marking to appear on said article thereby invalidating said article.

25. The device of claim 24 wherein said radiant energy comprises heat.

26. The device of claim 24 wherein said radiant energy comprises light.

27. The device of claim 24 wherein said radiant energy source comprises a light source directed via fiber optic methods.

28. The device of claim 24 wherein said radiant energy source comprises a tungsten halogen bulb.

29. The device of claim 28 wherein said radiant energy source produces light in excess of about 50 ergs/cm$^2$.

30. The device of claim 24 wherein said radiant energy source exposes at least said machine readable code so as to obscure said code in response to a validity signal from said comparator means.

31. A method for printing comprising flashing light in selected fiber optic bundles from an array of said bundles to form a desired pattern on a surface coated with a photosensitive material and an infra-red absorbing dye.

32. The method of claim 31 wherein said light is produced by a plurality of laser diodes.

33. The method of claim 31 wherein said desired pattern comprises a bar code.

34. The method of claim 31 wherein said desired pattern comprises an image of a number.

35. The document of claim 14 wherein the visible marking formed on said document by the sufficient intensity of non-visible wavelength light comprises a substantially premanent marking.

* * * * *